United States Patent [19]

Watanabe

[11] Patent Number: 4,802,226

[45] Date of Patent: Jan. 31, 1989

[54] PATTERN MATCHING APPARATUS

[75] Inventor: Takao Watanabe, Tokyo, Japan

[73] Assignee: NEC Corporation, Tokyo, Japan

[21] Appl. No.: 165,394

[22] Filed: Feb. 29, 1988

Related U.S. Application Data

[63] Continuation of Ser. No. 946,128, Dec. 23, 1986, abandoned, which is a continuation of Ser. No. 529,813, Sep. 6, 1983, abandoned.

[30] Foreign Application Priority Data

Sep. 6, 1982 [JP] Japan .................................. 57-154903

[51] Int. Cl.$^4$ .............................................. G10L 5/00
[52] U.S. Cl. ..................................... 381/43; 364/513.5
[58] Field of Search ..................................... 381/41–50; 364/513.5

[56] References Cited

U.S. PATENT DOCUMENTS 3,816,722 6/1974 Sakoe et al. ............................ 381/43
4,059,725 9/1977 Sakoe ..................................... 381/43
4,489,434 12/1984 Moshier ................................. 381/43

OTHER PUBLICATIONS

Komatsu, Ichikawa, Nakata, "Phoneme Recognition in Continuous Speech", ICASSP 82 Proceedings, May 3, 4, 5, 1982, vol. 2 of 3, IEEE International Conference on Acoustics, Speech and Signal Processing, pp. 883–886.

Primary Examiner—Emanuel S. Kemeny
Attorney, Agent, or Firm—Sughrue, Mion, Zinn, Macpeak & Seas

[57] ABSTRACT

Speech recognition pattern matching is improved by using reference VCV (vowel-consonant-vowel) patterns, wherein dynamic programming finds the pattern difference (d), then integrating in the positive time (g1) and negative time (g2), then connecting patterns for a total distance integral (g*=g1+g2).

9 Claims, 2 Drawing Sheets

PATTERN MATCHING APPARATUS

This is a continuation of application Ser. No. 946,128 filed 12/23/86, which is a continuation of application Ser. No. 529,813 filed 9/6/83 now abandoned.

BACKGROUND OF THE INVENTION

This invention relates to a pattern matching apparatus adapted to compare patterns, which are expressed as sequences of feature vectors, such as speech patterns.

A pattern matching method is widely used in a pattern recognition system in order to recognize an unknown pattern. In pattern recognition systems, pattern matching methods such as word level matching, and phoneme or syllable level matching has been proposed. With both of these methods, a time normalization matching method (a so-called DP matching method) utilizing dynamic programming for dealing with variations in speech speed, or the so-called two-step DP matching method proposed to prevent segmentation errors in continuously spoken word patterns and phoneme patterns have been used widely. These methods are described in detail in U.S. Pat. No. 3,816,722 and U.S. Pat. No. 4,049,913.

The number of reference patterns to be prepared in advance in connection with continuous speech recognition carried out with phoneme or syllable level matching may be extremely small as compared with that carried out by the word level matching. This allows a reduction in not only the user's reference pattern-registering load but also in the required memory capacity and in the required amount of computation. However, the recognition rate for the matching method which uses the phoneme level is low due to the influence of coarticulation.

In order to deal with such problems, it is useful that a consonant-vowel (which will be hereinafter referred to as "CV") combination and a vowel-consonant-vowel (which will be hereinafter referred to as "VCV") combination, which contain not only the ordinary information on phoneme level but also the information on the phoneme transition, be set as a recognition unit.

The following methods can generally be thought of as methods of preparing reference patterns.

(a) CV patterns are prepared. In this method, the number of reference patterns may be small. However, since reference patterns describing the V-to-C transition are not prepared, the recognition rate may decrease. Furthermore, it is difficult to determine a segmentation point because of the difficulty in finding a starting point of the consonant in continuous speech.

(c) VCV patterns are prepared. In this method, the reference pattern include both the V-to-C transition and C-to-V transition, so that attaining a high recognition rate can be expected. However, since there are a very large number of types of VCV patterns, the user's reference pattern-registering load, memory capacity and a processing requirements increase. A boundary between matching sections consists of a vowel, therefore, a matching section (segmentation points) can be easily determined because a vowel portion can be easily found. (c) CV patterns and VC patterns are prepared. In this method, a recognition rate as high as that in method (b) can be expected. Moreover, the number of types of reference patterns may be smaller than that used in method (b). However, it is not easy to cut out a section corresponding to VC.

SUMMARY OF THE INVENTION

Therefore, it is an object of the present invention to provide a pattern matching apparatus capable of reliably carrying out the syllable segmentation.

It is another object of the present invention to provide a pattern matching apparatus capable of reducing the user's reference pattern-registering load.

It is still another object of the present invention to provide a pattern matching apparatus capable of reducing memory capacity and the required amount of computation.

It is a further object of the present invention to provide a pattern matching appartaus used in a speech recognition system having all of the above-mentioned characteristics.

According to the present invention, a novel pattern matching apparatus can be obtained, which comprises a memory for storing an input pattern $A = \{a(1), a(2), \ldots, a(i), \ldots, a(I)\}$, which is expressed as a sequence of feature vectors; a memory for storing a first reference pattern $B_1 = \{b_1(1), b_1(2), \ldots, b_1(j), \ldots, b_1(J_1)\}$ and a second reference pattern $B_2 = \{b_2(1), b_2(2), \ldots b_2(j), \ldots, b_2(J_2)\}$, which are expressed as sequences of feature vectors; a calculator for calculating a first quantity representing a distance or other measurement representing a relationship between feature vectors $a(i)$ and $b_1(j)$ or $b_2(j)$ at the designated point $(i, j)$; the integral point using integral $g(i,j)$ being a calculator for calculating first and second quantities representing distances between features $a(i)$ and $b_1(j)$ and between features $a(i)$ and $b_2(j)$, respectively, at a designated point $(i,j)$; a calculator for calculating first and second integrals $g_1(i,j)$ and $g_2(i,j)$ of the first and second quantities at the point $(i,j)$ by a time normalization matching method utilizing dynamic programming on the basis of said first and second quantities at the point $(i,j)$, said first integral being obtained in a positive time direction from $(i,j) - (1,1)$ to $(I,J_1)$ with respect to said first reference pattern, and said second integral being obtained in a negative time direction from $(i,j) = (I,J_2)$ with respect to said second reference pattern; a calculator for calculating an optimum integral at a designated coordinate i as a minimum or maximum value out of a set $\{g_1(i, j), j = 1, 2, \ldots, J\}$ of integrals in the positive direction with respect to the integral $g_1(i, j)$ in the positive direction, and as a value of the integral $g(i, 1)$ at a starting point (i.e. $j=1$) with respect to the integral $g_2(i, j)$ in the negative direction; a memory for storing the optimum integral $\{g_1(i), i=1, 2, \ldots, I\}$ in the positive direction and the optimum integral $\{g_2(i), i=1, 2, \ldots, I\}$ in the negative direction; and a means for determining the first quantity between the input pattern and a reference pattern which is obtained by connecting a front portion of the first reference pattern and second reference pattern together as a minimum or maximum value out of the results obtained by calculating $g^*(i) = g_1(i) + g_2(i)$ for each i.

BRIEF DESCRIPTION OF THE DRAWINGS

FIG. 2 is a block diagram showing the construction of a pattern matching apparatus applied to speech recognition according to the present invention.

The above and other objects as well as characteristics of the invention will become apparent from the following description given with reference to the drawings.

DESCRIPTION OF THE PREFERRED EMBODIMENT

The basic principle of the present invention will be described first, and its concrete construction will then be described in detail with reference to an embodiment thereof. In pattern matching, which will now be described, the concept of distance is used as a measure; other measurements representing relationships between pattern may, of course, be used instead.

The present invention has been achieved by improving the previously-described method (c) thus reducing the user's reference pattern-registering load, memory capacity and required amount of computation. In the method according to the present invention, a VCV pattern is used instead of the VC pattern in the method (c) to describe the V-to-C transition. Matching is carried out by VCV level by using a pattern obtained by connecting a VC portion of the VCV pattern and a CV pattern. Thus, the matching can be carried out excellently with respect to the recognition rate, user's reference pattern-registering load, memory capacity, amount of processing required and easiness in segmentation.

In the pattern matching carried out using VCV level, a matching section (a segmentation) can be easily obtained (performed) if a vowel portion is used as a candidate for a VCV boundary. Let a sequence of feature vectors in a certain VCV section of the input speech be expressed by the following formula;

$$\{a(1), a(2), \ldots, a(i), \ldots, a(I)\} \quad (1),$$

and the VCV patterns to be matched with the above pattern be $V_1CV_2$. In this case the $V_1CV$ pattern (V may be arbitrarily selected) and the $CV_2$ pattern are used as reference patterns. Let the patterns $V_1CV$ and $CV_2$ be expressed by formulas (2) and (3).

$$\{b_1(1), b_1(2), \ldots, b_1(j), \ldots, b_1(J_1)\} \quad (2)$$

$$\{b_2(1), b_2(2), \ldots, b_2(j), \ldots, b_2(J_2)\} \quad (3)$$

Figures 1A, 1B:
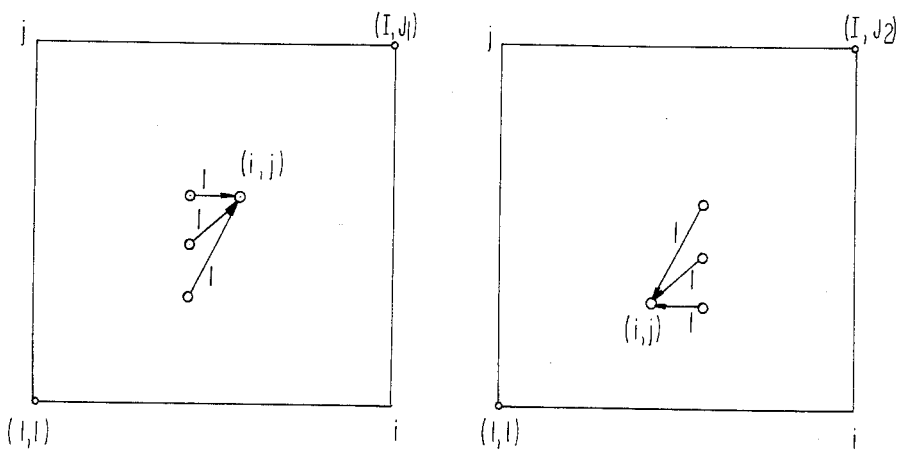
FIGS. 1A and 1B show slope constraints for matching paths and weighting for determining a distance integral according to the present invention.

Since $V_1CV_2$ is a pattern obtained by connecting a $V_1CV$ pattern and a $CV_2$ pattern, a $V_1C$ portion of the $V_1CV$ pattern and the $CV_2$ pattern are connected together to carry out the pattern matching. Namely, the DP matching is carried out in the positive time direction (i.e., in the direction from the point (1,1) to the point (I,J) in FIG. 1A, or in the direction as shown by symbol P in FIG. 2) with respect to the $V_1CV$ pattern, and in the negative time direction (i.e., in the direction from the point (I,$J_2$) to the point (1,1) in FIG. 1B, or in the direction as shown by symbol N in FIG. 2) with respect to the $CV_2$ pattern. An integral g(i, j) of a distance d(i, j) between the feature vectors a(i) and $b_1(j)$ (or $b_2(j)$) is developed in accordance with the following recurrence relation equation.

An integral $g_1(i, j)$ in the positive time direction under the initial condition $g_1(1, 1) = d_1(1, 1)$ is determined in accordance with the recurrence relation equation (4), $$g_1(i, j) = \min \left\{ \begin{array}{l} d(i, j) + g_1(i-1, j) \\ d(i, j) + g_1(i-1, j-1) \\ d(i, j) + g_1(i-1, j-2) \end{array} \right\} \quad (4)$$

wherein $j = 1, 2, \ldots, J_1$, for each i ranging from 1 to I. The equation (4) corresponds to the integration of a distance from the point (1, 1) up to the point (I, $J_1$) with a slope constraint and a weight shown in FIG. 1A on lattice time points of $1 \times J_1$.

An integral $g_2(i, j)$ in the negative time direction under the initial condition $g_2(I, J_2) = d_2(1, J_2)$ is determined in accordance with the equation (5), $$g_2(i, j) = \min \left\{ \begin{array}{l} d(i, j) + g_2(i-1, j) \\ d(i, j) + g_2(i-1, j+1) \\ d(i, j) + g_2(i-1, j+2) \end{array} \right\} \quad (5)$$

wherein $j = J_2, J_2-1, \ldots, 2, 1$, for each i ranging 1 to I (i = I, I−1, ... 2, 1). The equation (5) corresponds to the integration of a distance from the point (I, $J_2$) down to the point (1, 1) with an slope constraint and a weight shown in FIG. 1B.

The results of the above two DP matching operations are then combined with each other to obtain the matching results with respect to $V_1CV_2$. Namely, the sum, $$g'(i) = g_1(i, J_1) + g_2(i, 1) \quad (6)$$

of an integral in the positive direction and that in the negative direction at each input time i is determined.

$$g^* = \min_i g'(i) \quad (7)$$

is then determined with respect to all combinations of the two patterns, and, finally, a combination of the two patterns having a minimum value among all of the combinations is obtained as the result of recognition.

Such a combination of the two DP matching operations (the positive time direction matching an negative time direction matching) is disclosed in the Proceedings of the Institute of Acoustic Engineers of Japan, No. 2-2-18, published in October, 1979.

However, when this method is used, the matching of a pattern, in which the terminal end of the $V_1CV$ pattern is connected to the starting end of the $CV_2$ pattern, with an input pattern is carried out.

Figure 2:
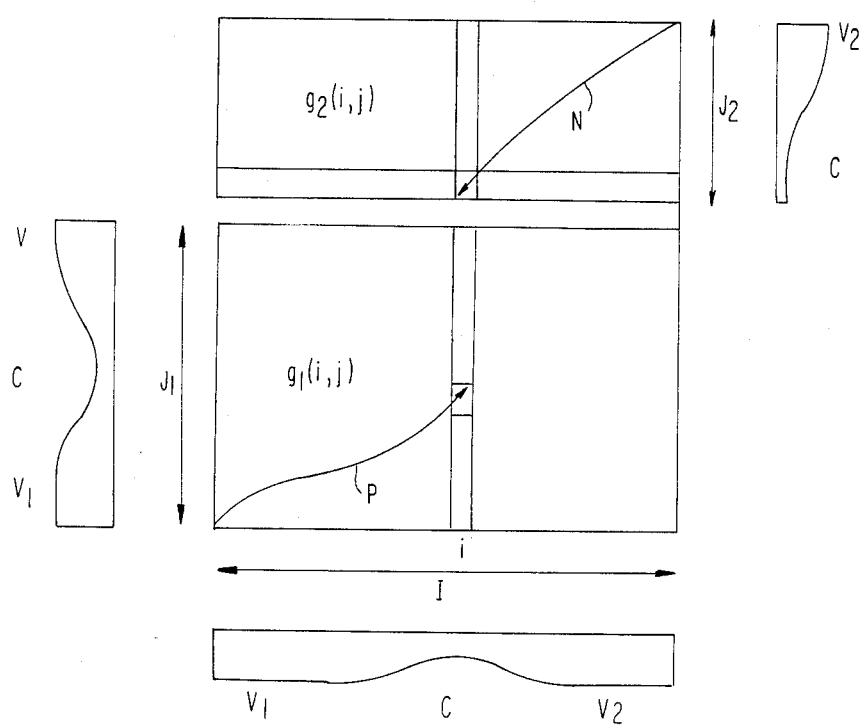
FIG. 2 illustrates the basic principle of the pattern matching according to the present invention.

In view of this, a $V_1CV$ pattern in the present invention is released at its terminal end, so that a starting end of a $CV_2$ pattern may be connected to any portion of the $V_1CV$ pattern. For the $V_1C_nV$ pattern when n-th consonant $C_n$ is selected among a predetermined number of consonants, $$g_1^*(i) = \min g_1(i, j) \quad (8)$$

$$j = 1, \ldots, J_1$$

is determined for each time point i of the input pattern, and for the $CV_2$ pattern, $$g_2^*(i) = g_2(i, 1) \quad (9)$$

is determined. Then, an integral $$g^* = \min_{i}\{g_1^*(i) + g_2^*(i)\} \quad (10)$$

is further obtained. An integral g* for an another consonant is then determined. The integrals g* for all of the consonants prepared in advance are determined in the same manner. Finally, a consonant indicating a minimum value is judged as the consonant in an intermediate position in the VCV pattern. As shown in FIG. 2, the equation (8) indicates the result of matching the portion before the i-th frame of an input pattern with $V_1CV$ pattern whose terminal end is released, and the equation (9) the results of matching the portion after the i-th frame of the input pattern with a $CV_1$ pattern whose both ends are fixed. The equation (10) indicates the optimum result of matching the VCV pattern with a pattern obtained by connecting a terminal end-released $V_1CV$ pattern and a starting end-fixed $CV_2$ pattern. Therefore, according to the present invention, matching using the VCV level is possible with respect to a VCV pattern which is not prepared. This allows the user's reference pattern-registering load and the capacity of a memory used for the registration to be reduced remarkably.

An example of the construction of the present invention applied to a speech recognition system will now be described. In this example, the recognition using the VCV syllable level is carried out as mentioned previously.

Figure 3:
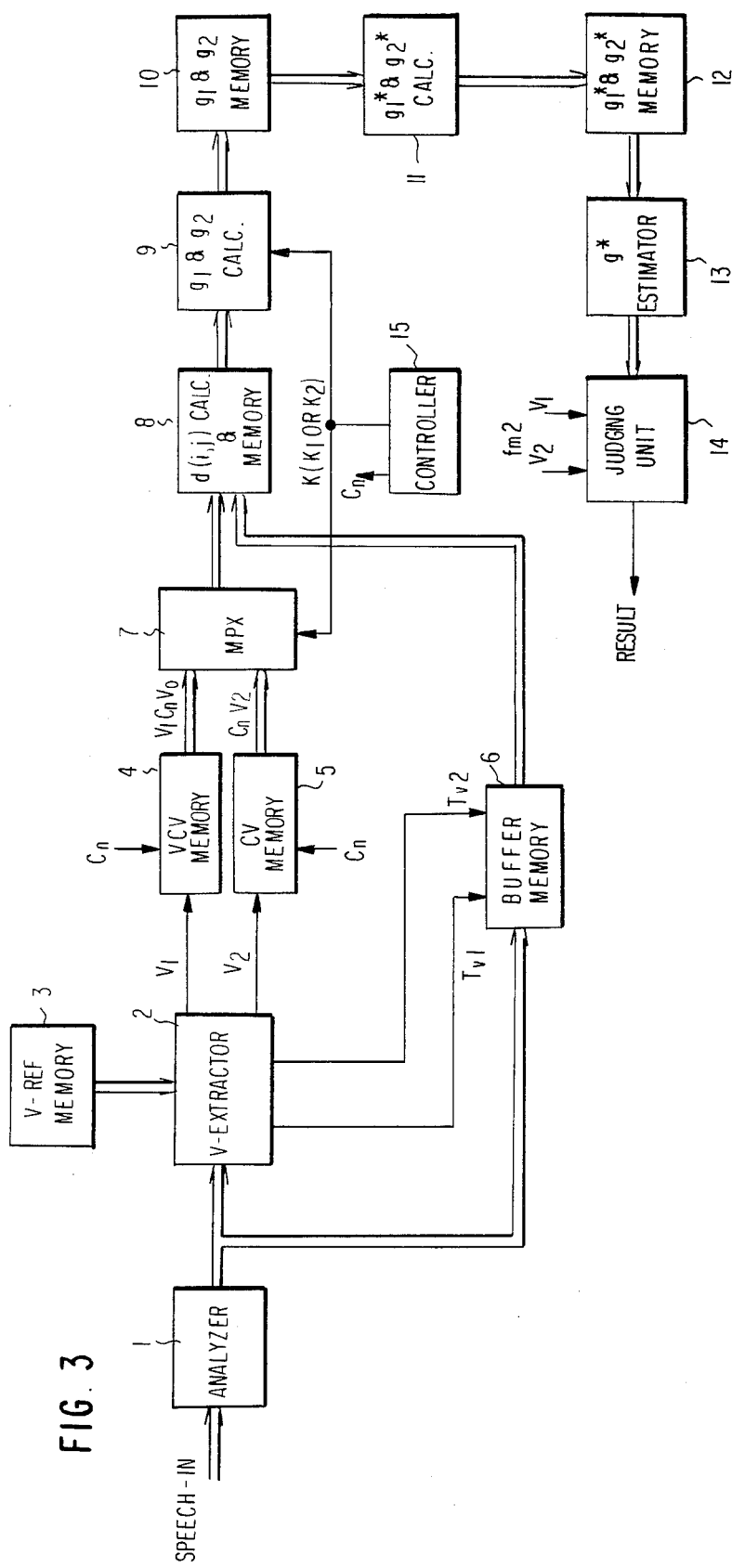

The analyzer unit 1 shown in FIG. 3 is adapted to extract a feature vector a(i) in an i-th frame, which consists of a predetermined number of feature parameters (for example, spectrum information), from an input speech signal, Speech-in, at every predetermined frame by a known method, and outputs an input pattern A of the formula (1) expressed by a sequence of feature vectors thus obtained.

In a vowel extractor unit 2, a vowel portion of the input pattern from the analyzer unit 1 is extracted to determine a boundary in a VCV syllable pattern and a segmentation signal representative of the boundary time point is generated. This boundary is preferably in the center of the vowel portion since a region in the vicinity of the center of the vowel portion is stable, and therefore, can be extracted easily. Each vowel is determined in the following manner. Sequences of feature vectors with respect to five predetermined vowels /a/, /i/, /u/, /e/, /o/ are obtained by training and stored in a vowel memory 3. A distance between a sequence of feature vectors of a vowel portion obtained from the input pattern and each of the sequences of feature vectors of vowels read out from the memory 3 is calculated to determine a vowel of the shortest distance as a vowel in the vowel portion of the input pattern. Let $V_i$ be a vowel in a front position in a VCV pattern thus determined, and $V_2$ a vowel in a rear position therein. Signals representative of these vowels are supplied to a VCV memory 4 and a VCV memory 5.

Figure 4:
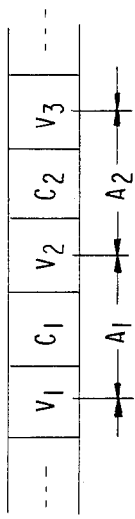
FIG. 4 illustrates an example of a method of separating an input speech pattern into VCV syllable patterns.

FIG. 4 shows the relation between the input pattern and the VCV syllable pattern. An input vowel pattern $A_1$ has as a vowel $V_1$ in a front position therein, a front half portion of a vowel $V_1$ being in a rear position of a preceding syllable pattern, and has a vowel $V_2$ in a rear position therein, a front half portion of a vowel $V_2$ in a rear position in the same pattern $A_1$. Namely, the pattern $A_1$ consists of $V_1C_1V_2$, and a pattern $A_2$ consists of $V_2C_2V_3$.

A sequence of feature vectors according to the equation (2) with respect to VCV patterns of all combinations of $V_1C_nV_0$ patterns, in which /a/, /i/, /u/, /e/, /o/ are allotted as vowels $V_1$ in a front position; an arbitrary vowel (/a/ in this embodiment) as a vowel $V_0$ in a rear position; and N pieces of consonants /k/, /s/, /t/, /c/, /n/, /h/, . . . /b/, /p/, /ky/, /ny/, /y/, /w/, which are prepared in advance, as consonants in the central position, are stored in the VCV memory 4. A sequence of feature vectors according to the equation (3) with respect to CV patterns, in which the above consonants and vowels are allotted as the consonant in a front position and the vowels in a rear position, are stored in advance in the CV memory 5. The speech of the above-mentioned patterns are uttered several times to obtain sequences of feature vectors using a means similar to the analyzer unit 1, and a representative sequence of vectors (for example, an average sequence of vectors) may be used. When semivowels /ya/, /yu/, /yo/ are added to the above-mentioned vowels allotted as V in the CV patterns stored in the CV memory 5, more accurate recognition can be achieved.

The VCV memory 4 and CV memory 5 generate a $V_1C_nV_0$ pattern and a $C_nV_2$ pattern, respectively, to a multiplexer 7 in response to signals representative of $V_1$, $V_2$ supplied from the vowel extractor unit 2 and a signal $C_n$ representative of a n-th consonant $C_n$.

On the other hand, a sequence of feature vectors of one utterance or a predetermined length of the input pattern is stored in a buffer memory 6. The buffer memory 6 generates a VCV syllable pattern having time points $T_{V1}$, $T_{V2}$ as boundary points to a distance calculator unit 8 in response to the segmentation signals $T_{V1}$, $T_{V2}$ supplied from the unit 2.

The multiplexer 7 is adapted to supply a signal from the VCV memory 4 when $K=K_1$, and a signal from the CV memory 5 when $K=K_2$, to the distance calculator unit 8 in accordance with a control signal K from a controller 15.

The calculator unit 8 is adapted to calculate a distance d(i, j) in a predetermined range of a frame i of the input pattern and a frame j of a reference pattern between a sequence of feature vectors of a VCV pattern or a CV pattern, which is a reference pattern from the multiplexer 7, and a sequence of feature vectors of the input pattern expressed by the formula (1) and supplied from the buffer memory 6. The distance d(i, j) thus obtained is stored in the calculator unit 8.

A recurrence relation calculator unit ($g_1$ & $g_2$ calculator unit) 9 is adapted to calculate a distance integral $g_1(i, j)$ between an input syllable pattern $V_1CV_2$ and a reference syllable pattern $V_1C_nV_0$ on the basis of equation (4) using a positive-direction DP matching method when $K=K_1$ and a distance integral $g_2(i, j)$ between the input syllable pattern $V_1CV_2$ and a reference syllable pattern $C_nV_2$ on the basis of the equation (5) using a negative-direction DP matching method when $K=K_2$, and store the results in a memory 10.

An optimum integral calculator unit 11 is adapted to calculate on the basis of equation (8) the smallest value $g_1^*(i)$ among a total of $J_1$ integrals obtained for each of the time points i of the input pattern read out from the memory 10 (wherein $J_1$ is the length of a reference pattern $V_1C_nV_0$). Also $g_2^*(i)$ is determined on the basis of the equation (9) as $g_2(i, 1)$. The $g_1^*(i)$ and $g_2^*(i)$ for the time points i thus obtained are stored in a memory 12.

A calculator (g* estimator) 13 is adapted to determine on the basis of the equation (10) a matching distance g* which gives the smallest sum of the integrals $g_1^*(i)$ and $g_2^*(i)$ for each time point i read out from the memory 12, and sends the resultant g* to a judging unit 14. The integral g* is a distance for the reference syllable pattern including the n-th consonant $C_n$, and, therefore, it is expressed as $g^*[C_n]$. A distance $g^*[C_{n+1}]$ for a reference syllable pattern including a (n+1)th consonant is then determined. The smallest value among a total of N pieces of thus obtained $g^*[C_n]$ (wherein n is 1 to N) distances is then determined in the judging unit 14 to conclude that the consonant giving the smallest value is the consonant C included in the input syllable pattern. Such a judging unit can be formed with a known minimum value detecting circuit consisting of a register and a comparator.

The judging unit 14 judges on the basis of the vowels $V_1$, $V_2$ extracted by the vowel extractor unit 2 and the consonant C concludes as mentioned above that the input syllable pattern is $V_1CV_2$, and outputs the conclusion as the result of the determination or recognition.

According to the above operations, the recognition of one input syllable pattern $A_1$ (in FIG. 4) among the time sequence syllable patterns is completed, and the recognition of a subsequent input syllable pattern $A_2$ is then carried out. The time sequence syllable patterns are thus recognized in order with the vowels therein in an overlapping state. Finally, the input speech is recognized with due consideration given to the overlapping recognition of vowels.

In the above described embodiment of the present invention, the asymmetric equations (4) and (5) are used as the recurrence relation equations for the DP matching. In addition to these, there are some symmetric equations for the DP matching. For example, $$g_1(i,j) = \min \begin{pmatrix} d(i,j) + g_1(i-1,j) \\ d(i,j) + g_1(i,j-1) \\ 2d(i,j) + g_1(i-1,j-1) \end{pmatrix} \quad (11)$$

can be used instead of the equation (4), and $$g_2(i,j) = \min \begin{pmatrix} d(i,j) + g_2(i+1,j) \\ d(i,j) + g_2(i,j+1) \\ 2d(i,j) + g_2(i+1,j+1) \end{pmatrix} \quad (12)$$

instead of the equation (5). It has been experimentally proven that the DP matching according to a symmetric equation has a higher recognition performance than the DP matching according to an asymmetric equation. When a symmetric equation is used, it is necessary that the integrals $g_1$, $g_2$ be normalized on the basis of the lengths of an input pattern and a reference pattern. Where a matching operation is carried out with both ends of the patterns fixed, the integrals are generally normalized by the sum of the lengths of two patterns to be compared with other. Let, for example, I and J be the lengths of two patterns to be compared. A matching distance finally determined is expressed as:

$$G = \frac{1}{I+J} g(I,J)$$

When the same concept is applied to the present invention, $$g^* = \min_i \frac{1}{I + \left(\frac{i}{I}\right)J_1 + J_2} (g_1^*(i) + g_2^*(i)) \quad (13)$$

can be used instead of, for example, the equation (7). In the equation (7), the integrals are normalized by the weighted sum of the lengths of input pattern and reference patterns.

Therefore, when the equations (11) and (12) are used, an apparatus according to the present invention is so formed that a matching distance calculator unit is capable of normalizing integrals by dividing the sum g*(i) of optimum integrals in the positive direction and optimum integration amounts in the negative direction for the respective i's by the weighted sum of the input pattern and two reference patterns, and thereafter determining a minimum value out of the resulting values.

What is claimed is:

1. A pattern matching apparatus comprising:
   a first memory for storing an input patter A={a(1), a(2), . . . , a(i), . . . , a(I)}, which is expressed as a sequence of feature vectors;
   a second memory for storing a first reference pattern $B_1$={$b_1(1)$, $b_1(2)$, . . . , $b_1(j)$, . . . , $b_1(J_1)$} and a second reference pattern $B_2$={$b_2(1)$, $b_2(2)$, . . . , $b_2(j)$, . . . , $b_2(j_2)$}, which are expressed as sequences of feature vectors;
   a first calculator for calculating first and second quantities representing distances between said features a(i) and $b_1(j)$ and between said features a(i) and $b_2(j)$, respectively, at designated point (i, j);
   a second calculator for calculating first and second integrals $g_1(i,j)$ and $g_2(i,j)$ of said first and second quantities at the point (i, j) by a time normalization matching method utilizing dynamic programming on the basis of said first and second quantities at the point (i,j), said first integral being obtained in a positive time direction from (i,j)=(1,1) to (I,$J_2$) with respect to said first reference pattern, and said second integral being obtained in a negative time direction from (i,j)=($I_1$,$J_2$) to (1,1) with respect to said second reference pattern;
   a third calculator for calculating an optimum integral at a designated i as a minimum or maximum value out of a set {$g_1(i,j), j=1, 2, \ldots, J$} of the integrals in the positive direction with respect to the integral $g_1(i,j)$ in a positive direction, and as a value of the integral g(i, 1) at a starting end (i.e. j=1) with respect to the integral $g_2(i,j)$ in the negative direction;
   a third memory for storing the optimum integral {g, (i), i=1, 2, . . . , I} in the positive direction and the optimum integral {$g_2(i)$, [=1, 2, . . . , I} in the negative direction; and
   a determination means for determining a whole quantity between said input pattern and a reference pattern which is obtained by connecting a front portion of said first reference pattern and a second reference pattern together as a minimum or maximum value out of the results obtained by calculating $g^*(i) = g_2(i) + g_2(i)$ for each i.

2. An apparatus according to claim 1, wherein said determination means develops a minimum or maximum value obtained by dividing the $g^*(i)$ by the weighted sum of the length of said input pattern and said first and second reference patterns.

3. An apparatus according to claim 2, wherein a minimum value of said normalized $g^*(i)$ is expressed by:

$$\min \frac{1}{I + \left(\frac{i}{I}\right) J_1 + J_2} (g_1^*(i) + g_2^*(i)).$$

4. An apparatus according to claim 1, wherein $$g_1(i,j) = \min \begin{Bmatrix} d(i,j) + g_1(i-1,j) \\ d(i,j) + g_1(i-1,j-1) \\ d(i,j) + g_1(i-1,j-2) \end{Bmatrix}; \text{ and}$$

$$g_2(i,j) = \min \begin{Bmatrix} d(i,j) + g_2(i+1,j) \\ d(i,j) + g_2(i+1,j+1) \\ d(i,j) + g_2(i+1,j+2) \end{Bmatrix}$$

5. An apparatus according to claim 1, wherein $$g_1(i,j) = \min \begin{Bmatrix} d(i,j) + g_1(i-1,j) \\ d(i,j) + g_1(i,j-1) \\ 2d(i,j) + g_1(i-1,j-1) \end{Bmatrix}; \text{ and}$$

$$g_2(i,j) = \min \begin{Bmatrix} d(i,j) + g_2(i+1,j) \\ d(i,j) + g_2(i,j+1) \\ 2d(i,j) + g_2(i+1,j+1) \end{Bmatrix}$$

6. A pattern matching apparatus for the recognition of speech, comprising:
a first means for extracting a vowel portion from an input speech pattern expressed as a sequence of feature vectors;
a second means for storing a predetermined portion of said input speech pattern and outputting an input pattern $A = \{a(1), a(2), \ldots, a(i), \ldots, a(I)\}$ as a syllable pattern $V_1CV_2$ consisting of two extracted vowels $V_1$, $V_2$ and a consonant C existing therebetween;
a third means for storing syllable patterns consisting of combinations a predetermined number of first vowels, a predetermined number of consonants and second vowels with the order of these vowels and consonants maintained, the number of said second vowels being smaller than that of said first vowels, and outputting a first reference pattern $B_1\{b_1(1), b_1(2), \ldots, b_1(j), \ldots, b_1(J_1)\}$ as a syllable pattern $V_1C_nV_0$ in response to said extracted vowel $V_1$, designated consonant $C_n$ and second vowel $V_0$;
a fourth means for storing syllable patterns consisting of combinations of a predetermined number of consonants and a predetermined number of third vowels with the order of these consonants and vowels maintained, and outputting a second reference pattern $B_2 = \{b_2(1), b_2(2), \ldots, b_2(j), \ldots, b_2(J_2)\}$ as a syllable pattern $C_nV_2$ in response to said designated consonant $C_n$ and said extracted vowel $V_2$; a fifth means for calculating first and second quantities representing distances between said features $a(i)$ and $b_1(j)$ and between said features $a(i)$, respectively, at the designated point $(i,j)$;
a sixth means for calculating first and second integrals $g_1(i,j)$ of said first and second quantities at the point $(i,j)$ by a time normalization matching method utilizing dynamic programming on the basis of said first and second quantities at the point $(i,j)$, said first integral being obtained in a positive time direction from $(i,j) = (1,1)$ to $(I,J_1)$ with respect to said first reference pattern, and said second integral being obtained in a negative time direction from $(i,j) = (I,J_2)$ to $(1,1)$ with respect to said second reference pattern;
a seventh means for determining an optimum integration amount for a designated i as a minimum or maximum value out of a set $\{g(i,j), j = 1, 2, \ldots, J\}$ of the integration amount in the positive direction with respect to the integration amount $g_1(i,j)$ in the positive direction, and as a value of the integration amount $g(i,j)$ at a terminal end point (i.e. $j = 1$) with respect to the integration amount $g_2(i,j)$ in the negative direction;
an eighth means for storing the optimum integration amount $\{g_1(i), i = 1, 2, \ldots, I\}$ in the positive direction and optimum integration amount $\{g_2(i), i = 1, 2, \ldots, I\}$ in the negative direction;
a ninth means for determining $g^*(i) = g_1(i) + g_2(i)$ for each i with all of the consonants designated, to obtain a minimum or maximum value out of the results of the determination; and
a tenth means for determining a designated consonant giving the minimum or maximum value of $g^*$ as a consonant included in said input syllable pattern.

7. An apparatus according to claim 6, wherein said second vowel is one predetermined vowel.

8. An apparatus according to claim 6, wherein semi-vowels are included as said first and second vowels.

9. An apparatus according to claim 6, wherein said input pattern is a syllable pattern having a boundary in substantially the center of an extracted vowel.

* * * * *

UNITED STATES PATENT AND TRADEMARK OFFICE
CERTIFICATE OF CORRECTION

PATENT NO. : 4,802,226

DATED : January 31, 1989

INVENTOR(S) : TAKAO WATANABE

It is certified that error appears in the above-identified patent and that said Letters Patent is hereby corrected as shown below:

Col. 1, line 53, delete "(c)" and insert --(b)--.

Col. 2, line 39, delete "(i,j) --" and insert --(i,j) == --.

line 43, delete "i" and insert --$\underline{i}$--.

line 58, delete "i" and insert --$\underline{i}$--.

line 66, delete "FIG. 2" and insert --FIG. 3--.

Col. 4, lines 18-21 delete "	d(i,j) + g2(i-1, j)	"
                                    d(i,j) + g2(i-1, j+1)
                                    d(i,j) + g2(i-1, j+2)

and insert --    d(i,j) + g2(i+1, j)
                                d(i,j) + g2(i+1, j+1)
                                d(i,j) + g2(i+1, j+2)

line 34, delete "i" and insert --$\underline{i}$--.

line 64, delete "i" and insert --$\underline{i}$--.

Col. 5, line 61, delete "VCV" and insert --CV--.

Col. 6, line 8, delete "N" and insert --$\underline{N}$--.

line 9, after "/ky/," insert --/my/,--.

line 44, delete "i" and insert --$\underline{i}$--.

line 45, delete "j" and insert --$\underline{j}$--.

UNITED STATES PATENT AND TRADEMARK OFFICE
CERTIFICATE OF CORRECTION

PATENT NO. : 4,802,226

DATED : January 31, 1989

INVENTOR(S) : TAKAO WATANABE

It is certified that error appears in the above-identified patent and that said Letters Patent is hereby corrected as shown below:

Col. 6, line 65, delete "i" and insert --$\underline{i}$--.

Col. 7, line 1, delete "i" and insert --$\underline{i}$--.

line 6, delete "i" and insert --$\underline{i}$--.

line 13, delete "n" and insert --$\underline{n}$--.

Col. 8, line 29, delete "patter" and insert --pattern--.

line 47, delete "$(I,J_2)$" and insert --$(I,J_1)$--.

line 62, delete "[ = 1" and insert --i = 1 =--.

Signed and Sealed this

Thirty-first Day of October, 1989

Attest:

DONALD J. QUIGG

*Attesting Officer*  *Commissioner of Patents and Trademarks*